(12) United States Patent
Goertz

(10) Patent No.: US 7,092,503 B2
(45) Date of Patent: Aug. 15, 2006

(54) METHOD FOR ADDRESSING SHORT MESSAGES TO AT LEAST ONE TERMINAL SUITABLE FOR RECEIVING THE SAME IN A FIXED NETWORK

(75) Inventor: Werner Goertz, Dorsten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/472,869

(22) PCT Filed: Mar. 22, 2002

(86) PCT No.: PCT/DE02/01055

§ 371 (c)(1),
(2), (4) Date: Sep. 22, 2003

(87) PCT Pub. No.: WO02/078374

PCT Pub. Date: Oct. 3, 2002

(65) Prior Publication Data

US 2004/0137920 A1    Jul. 15, 2004

(30) Foreign Application Priority Data

Mar. 22, 2001  (DE) ................................ 101 14 112

(51) Int. Cl.
H04M 7/00    (2006.01)
H04Q 7/20    (2006.01)
(52) U.S. Cl. .................. 379/220.01; 455/466
(58) Field of Classification Search .......... 379/216.01, 379/355.01, 220.01, 207.02, 230; 455/466, 455/445
See application file for complete search history.

(56) References Cited

U.S. PATENT DOCUMENTS 5,539,817 A * 7/1996 Wilkes ....................... 379/230

FOREIGN PATENT DOCUMENTS

WO    WO 99/16149        4/1999
WO    WO 01/20929 A1     3/2001

OTHER PUBLICATIONS

Manual by ETSI (2001-02) entitled "Access and Terminals (AT); Short Message Service (SMS) for PSTN/ISDN; Short Message Communication between a fixed network Short Message Terminal Equipment and a Short Message Service Centre.".

(Continued)

Primary Examiner—Benny Q. Tieu
(74) Attorney, Agent, or Firm—Bell, Boyd & Lloyd LLC

(57) ABSTRACT

A method is provided for addressing short messages in a fixed network, both to fixed-network terminals that are operated as standalone units in a fixed network or to terminals that are operated in parallel in the fixed network and to extensions of cord-connected or cordless fixed-network terminals that are configured as private branch exchanges and operated either as standalone units or in parallel in the fixed network. To achieve this, several numeric identifiers are assigned to each fixed network terminal in order to address the short messages, in such a way for a fixed network terminal that is configured as a private branch exchange, the numeric identifiers can be arbitrarily distributed among the extensions.

3 Claims, 2 Drawing Sheets

OTHER PUBLICATIONS

Draft Manual by ETSI (2001-02) entitled "Access and Terminals (AT); Short Message Service (SMS) for PSTN/ISDN; Short Message Communication between a fixed network Short Message Terminal Equipment and a Short Message Centre.".

Article entitled "SMS-Anwendungen in Mibilfunknetzen" Mobilfunk —Praxis; Funkschau 1998, pp. 67-69.

* cited by examiner

METHOD FOR ADDRESSING SHORT MESSAGES TO AT LEAST ONE TERMINAL SUITABLE FOR RECEIVING THE SAME IN A FIXED NETWORK

BACKGROUND OF THE INVENTION

The sending and receiving of short messages has, to date, been offered as a telecommunications service in GSM radio networks, wherein subscriber A can transfer up to 160 alphanumeric characters in one transmission session to subscriber B (cf.: Funkschau 19/98, pages 67 to 69). Efforts currently are being made to implement this service in fixed networks as well, e.g., in the Public Switched Telecommunications Network (PSTN) or the Integrated Services Digital Network (ISDN). A publication on the subject of "Access and Terminal (AT)—Short Message Service (SMS) for PSTN/ISDN" has been produced at the European Standardizations Institute for Telecommunications ETSI under registration number DES/AT-030009 Vol. 0.1.1; 2001-02. This SMS service in the fixed network enables short messages to be sent and received in the fixed network with appropriate fixed-network telephones (both ISDN telephones and PSTN telephones). In this service, messages are always sent and received via a service center specially designed for this purpose, called the Short Message Service Center (SMSC), which is connected to the public telephone network.

For the parallel operation of several SMS-compatible terminals on an analog or digital fixed-network connection, a numeric identifier known as the terminal identifier (TID) is currently used to address a short message to a required terminal. The user is able to assign such a TID specifically to a terminal. The terminal in question then responds only to calls from the Short Message Service Center that correspond precisely to this one TID. However, it does not permit short messages to be addressed to SMS-compatible extensions, known as SMS entities (extensions for receiving short messages) of cord-connected or cordless fixed-network terminals that are configured as a private branch exchange and can be operated in parallel on the fixed network; e.g., DECT portable units of a DECT cordless telephone or internal subscribers of telecommunications systems.

In ISDN private branch exchanges operated on the ISDN network, it is known for the individual extensions of the telecommunications system to be addressed via multiple subscriber numbers (MSN).

An object of the present invention, therefore, is to address short messages in a fixed network, both to fixed-network terminals that are operated as standalone units in the fixed network or to terminals that are operated in parallel in the fixed network and to SMS-compatible extensions known as SMS entities (extensions for receiving short messages), of cord-connected or cordless fixed-network terminals that are configured as private branch exchanges and operated either as standalone units or in parallel in the fixed network.

SUMMARY OF THE INVENTION

The idea upon which the present invention is based is that several initial, single-digit numeric identifiers are assigned to each fixed-network terminal in order to address the short messages, such that, for a fixed-network terminal that is configured as a private branch exchange, the numeric identifiers can be arbitrarily distributed among the extensions.

The introduction of second, single-digit numeric identifiers in addition to the initial single-digit numeric identifiers, according to an alternative embodiment of the present invention, makes it possible to increase the total number of terminals that may be addressed in a fixed network.

The use of the first and second numeric identifiers, in accordance with another alternative embodiment of the present invention, makes it possible to differentiate easily between fixed-network terminals to be addressed and fixed-network extensions to be addressed.

Additional features and advantages of the present invention are described in, and will be apparent from, the following Detailed Description of the Invention and the Figures.

DETAILED DESCRIPTION OF THE INVENTION

Figure 1:
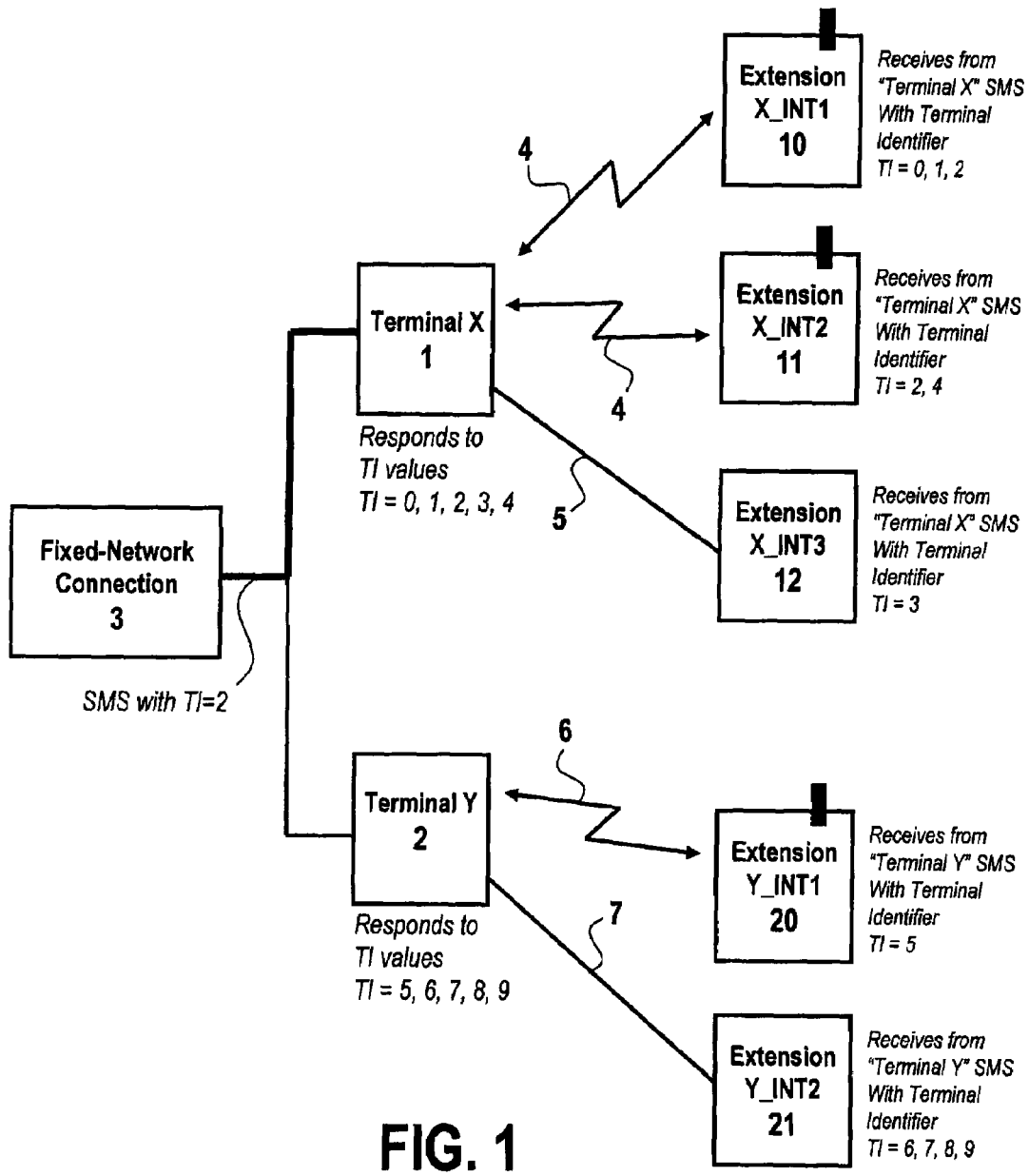
FIG. 1 shows, a first exemplary embodiment, an SMS fixed-network scenario with two private branch exchanges operated in parallel on the fixed-network connection, several assigned extensions and a single-digit numeric identifier (TID).

FIG. 1 is an SMS fixed-network scenario having two fixed-network terminals 1, 2, whereby the first terminal, "Terminal X", is 1, and the second terminal, "Terminal Y", is 2. The terminals 1, 2 are respectively configured as a private branch exchange; for example, in the form of a cordless base station as per the DECT standard or a telecommunications system. The terminals 1, 2 are operated or connected on a fixed-network connection 3 which is configured, for example, as an analog a/b connection.

The first terminal configured as a private branch exchange, "Terminal X" 1, has three extensions 10, 11, 12 (a first extension, "Extension X_INT1" 10, a second extension, "Extension X_INT2" 11, and a third extension, "Extension X_INT3" 12), for internal subscribers, of which the first extension, "Extension X_INT1" 10 and the second extension, "Extension X_INT2" 11, are configured, —for example, as cordless portable units connected to "Terminal X" 1 via a radio interface 4, while the third extension, "Extension X_INT3" 12, is —configured, for -example, as a normal telephone connected to "Terminal X" 1 via a line interface 5.

The second terminal configured as a private branch exchange, "Terminal Y" 2, has two extensions 20, 21 (a first extension, "Extension Y_INT1" 20 and a second extension, "Extension Y_INT2" 21, for internal subscribers), of which the first extension, "Extension Y_INT1" 20, is —configured, for —example, as a cordless portable unit and is connected to "Terminal Y" 2 via a radio interface 6, while the second extension, "Extension Y_INT2" 21, is —configured, for —example, as a normal telephone connected to "Terminal Y" 2 via a line interface 7.

According to the SMS fixed-network scenario shown in FIG. 1, a single-digit numeric identifier TI in the range 0 . . . 9, known as the Terminal Identifier, is used in such a way that several TI values are assigned to the first terminal, "Terminal X" 1, namely TI=0, 1, 2, 3, 4, and to the second terminal, "Terminal Y" 2, namely TI=5, 6, 7, 8, 9, instead of only a single TI value being respectively assigned to "Terminal X" 1 and to "Terminal Y" 2 as in the prior art.

In other words: the first terminal, "Terminal X" 1, responds to the TI values TI=0, 1, 2, 3, 4, while the second terminal, "Terminal Y" 2, responds to the TI values TI=5, 6, 7, 8, 9.

In this way, SMS messages can be addressed to the extensions 10, 11, 12, 20, 21, which are assigned to the terminals 1,2 as shown in FIG. 1, whereby, taking into account the TI values assigned to the respective terminal 1, 2 in question, the following TI values being assigned, for example:

the TI values TI=0, 1, 2 are assigned to the internal subscriber at the first extension, "Extension X_INT1" 10, belonging to the first terminal "Terminal X" 1;

the TI values TI=2, 4 are assigned to the internal subscriber at the second extension, "Extension X_INT2" 11, belonging to the first terminal "Terminal X" 1;

the TI value TI=3 is assigned to the internal subscriber at the third extension, "Extension X_INT3" 12, belonging to the first terminal "Terminal X" 1;

the TI value TI=5 is assigned to the internal subscriber at the first extension, "Extension Y_INT1" 20, belonging to the second terminal "Terminal Y" 2; and the TI values TI=6, 7, 8, 9 are assigned to the internal subscriber at the second extension, "Extension Y_INT2" 21, belonging to the second terminal "Terminal Y" 2.

It should be pointed out at this stage that, in principle, the single-digit numeric identifiers from 0 to 9 may be arbitrarily distributed among the terminals and extensions involved in the SMS fixed-network scenario, provided it is ensured that several numeric identifiers are assigned to each terminal 1, 2 operated on the network termination 3. In practice, though, it is preferable to allocate to a terminal configured as a private branch exchange only as many numeric identifiers as there are extensions operated behind the private branch exchange.

If, in the illustrated SMS fixed-network scenario of the service center specially configured for the sending and receiving of short messages, known as the "Short Message Service Center", which is connected to the public telephone network, an SMS call with the TI value TI=2 is now received via the network termination 3 at the terminals 1, 2 connected to it, then the first terminal, "Terminal X" 1, would respond to the call and would transfer or forward it in accordance with the illustrated distribution of TI values to the internal subscribers at the assigned first extension, "Extension X_INT1" 10, and to the internal subscribers at the assigned second extension, "Extension X_INT2" 11. This corresponds to the message flow printed in bold in FIG. 1.

Figure 2:
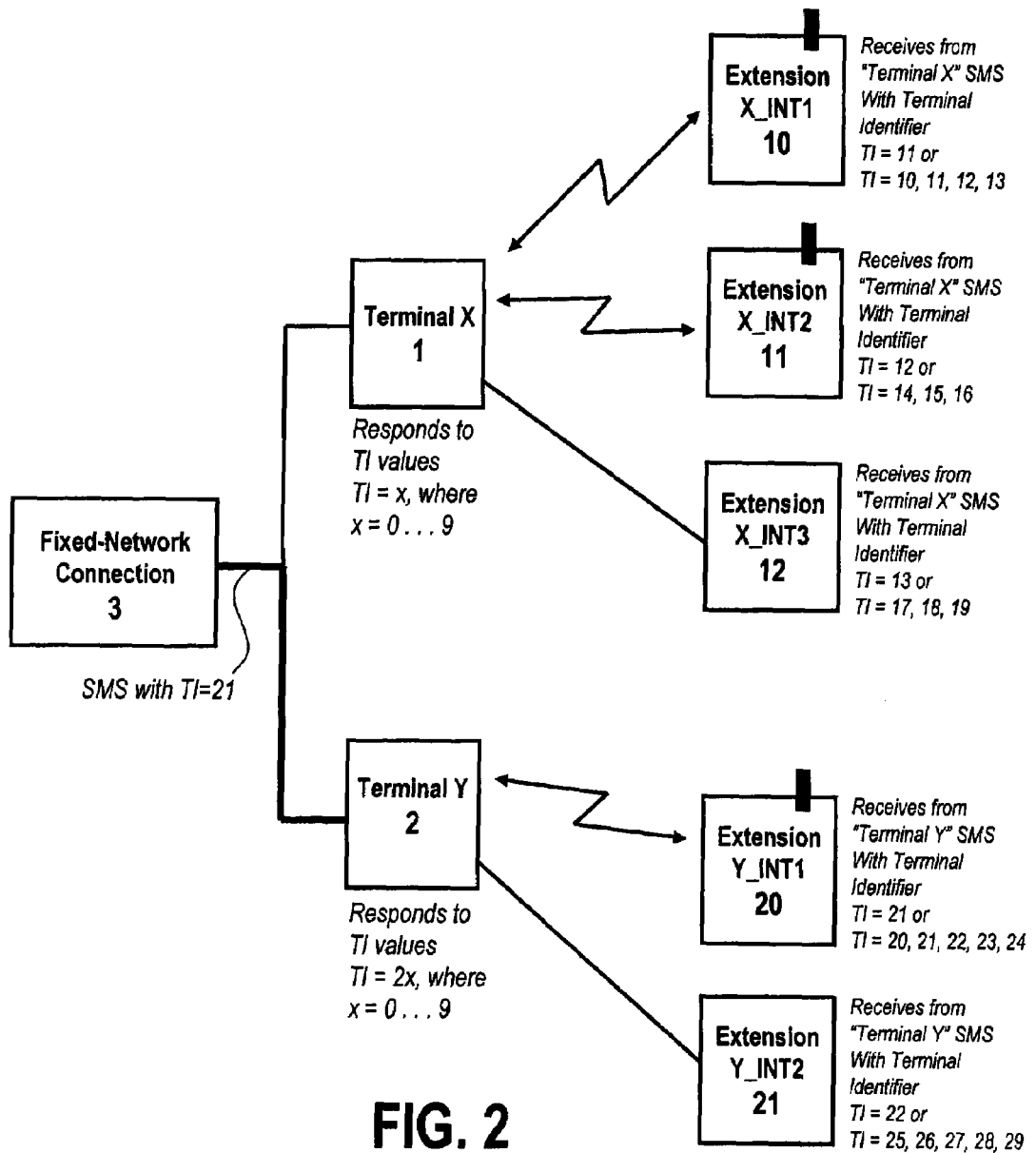
FIG. 2 shows, a second exemplary embodiment, an SMS fixed-network scenario with two private branch exchanges operated in parallel on the fixed-network connection, several assigned extensions and a two-digit numeric identifier (TID).

FIG. 2 shows an SMS fixed-network scenario in which the two fixed-network terminals 1, 2 (the first terminal, "Terminal X" 1, and the second terminal, "Terminal Y" 2) which are configured as a private branch exchange, such as in the form of a cordless base station as per the DECT standard or a telecommunications system, are operated or connected on the fixed-network connection 3; for example, as an analog a/b connection.

The first terminal configured as a private branch exchange, "Terminal X" 1, again has the three extensions 10, 11, -12 (the first extension, "Extension X_INT1" 10, the second extension, "Extension X_INT2" 11, and the third extension, "Extension X_INT3" 12), for internal subscribers, of which the first extension, "Extension X_INT1" 10 and the second extension, "Extension X_INT2" 11 are configured, for example, as cordless mobile units connected to "Terminal X" 1 via the radio interface 4, while the third extension, "Extension X_INT3" 12, is configured, for example, as a normal telephone connected to "Terminal X" 1 via the line interface 5.

The second terminal configured as a private branch exchange, "Terminal Y" 2, again has the two extensions 20, 21 (the first extension, "Extension Y_INT1" 20, and the second extension, "Extension Y_INT2" 21), for internal subscribers, of which the first extension, "Extension Y_INT1" 20 is configured, for example, as a cordless mobile unit connected to "Terminal Y" 2 via the radio interface 6, while the second extension, "Extension Y_INT2" 21, is configured, for example, as a normal telephone connected to "Terminal Y" 2 via the line interface 7.

According to the SMS fixed-network scenario shown in FIG. 2, a two-digit numeric identifier TI in the range 0 . . . 9, known as the Terminal Identifier, is used in such a way that the first terminal, "Terminal X" 1, and the second terminal, "Terminal Y" 2, are each assigned an initial digit from the two-digit numeric identifier for the purpose of addressing the respective terminals; namely, the digit "1" to the first terminal "Terminal X" 1, and the digit "2" to the second terminal, "Terminal Y".

Moreover, the extensions 10, 11, 12, 20, 21 assigned to the first and second terminals are each assigned at least one second digit of the two-digit numeric identifier, wherein:

the first extension, "Extension X_INT1" 10, of the first terminal "Terminal X" 1, is assigned either the digit "1" or the digits "0, 1, 2, 3", resulting in the TI values TI=11 or TI=10, 11, 12, 13 for the first extension, "Extension X_INT1" 10;

the second extension, "Extension X_INT2" 11, of the first terminal, "Terminal X" 1, is assigned either the digit "2" or the digits "4, 5, 6", resulting in the TI values TI=12 or TI=14, 15, 16 for the second extension, "Extension X_INT2" 11;

the third extension, "Extension X_INT3" 12, of the first terminal, "Terminal X" 1, is assigned either the digit "3" or the digits "7, 8, 9", resulting in the TI values TI=13 or TI=17, 18, 19 for the third extension, "Extension X_INT3" 11;

the first extension, "Extension Y_INT1" 20, of the second terminal "Terminal Y" 2, is assigned either the digit "1" or the digits "0, 1, 2, 3, 4", resulting in the TI values TI=21 or TI=20, 21, 22, 23, 24 for the first extension, "Extension Y_INT1" 20; and the second extension, "Extension Y_INT2" 21, of the second terminal "Terminal Y" 2, is assigned either the digit "2" or the digits "5, 6, 7, 8, 9", resulting in the TI values TI=22 or TI=25, 26, 27, 28, 29 for the second extension, "Extension Y_INT2" 21.

In other words: the first terminal, "Terminal X" 1, responds to the TI values TI=1x, where x is a digit from the range 0 . . . 9, while the second terminal, "Terminal Y" 2, responds to the TI values TI=2x, where x is a digit from the range 0 . . . 9.

It should be noted at this stage that a numeric identifier with more than two digits also can be used instead of a two-digit numeric identifier. This would permit an alternative type of configuration.

In this way, SMS messages may be addressed either directly —or, because of free —configurability, indirectly to the extensions 10, 11, 12, 20, 21, which are assigned to the terminals 1,2 as shown in FIG. 1, as an alternative to the first exemplary embodiment.

It again should be pointed out at this stage that, in principle, the two-digit numeric identifiers from 0 to 9 may, in each case, be arbitrarily distributed among the terminals and extensions involved in the SMS fixed-network scenario. In practice, though, it is preferable to allocate to a terminal configured as a private branch exchange only as many numeric identifiers as there are extensions operated behind this private branch exchange.

If, in the illustrated SMS fixed-network scenario of the service center specially configured for the sending and receiving of short messages, known as the "Short Message Service Center", which is connected to the public telephone network, an SMS call with the TI value TI=21 is now received via the network termination 3 at the terminals 1, 2, connected to it, then the second terminal, "Terminal Y" 2, would respond to call and would transfer or forward it in accordance with the illustrated distribution of TI values to the internal subscribers at the associated first extension, "Extension Y_INT1" 20. This corresponds to the message flow printed in bold in FIG. 2.

Although the present invention has been described with reference to specific embodiments, those of skill in the art will recognize that changes may be made thereto without departing from the spirit and scope of the present invention as set forth in the hereafter appended claims.

The invention claimed is:

1. A method for addressing short messages to at least one terminal receiving the short messages in a fixed network, the method comprising the steps of:
    assigning an initial one-digit numeric identifier to a respective fixed-network terminal; and
    assigning a plurality of numeric identifiers to each fixed-network terminal such that, for a fixed-network terminal configured as a private branch exchange with a plurality of extensions, the plurality of numeric identifiers are arbitrarily distributed among the plurality of extensions.

2. A method for addressing short messages to at least one terminal suitable for receiving the short messages in a fixed network as claimed in claim 1, wherein each respective numeric identifier is formed from a second single-digit numeric identifier in addition to the initial one-digit numeric identifier.

3. A method for addressing short messages to at least one terminal suitable for receiving the short messages in a fixed network as claimed in claim 2, wherein each respective fixed-network terminal is addressed with the initial one-digit numeric identifier and the plurality of extensions are addressed with the second single-digit numeric identifier in the respective fixed-network terminal configured as a private branch exchange.

* * * * *